United States Patent Office 3,395,924
Patented Aug. 6, 1968

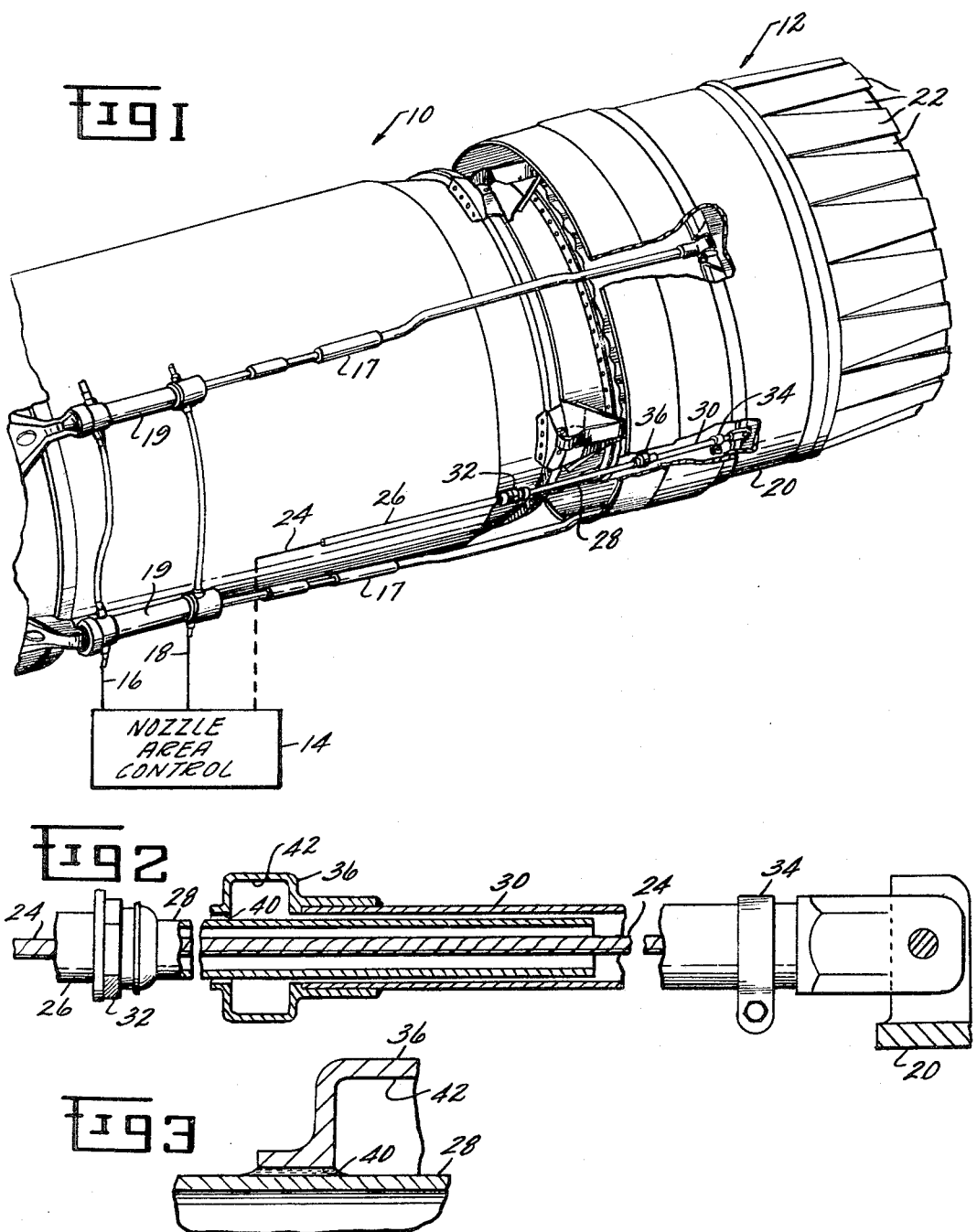

3,395,924
SEAL FOR TELESCOPED MEMBERS
Kermit J. Shumard and Ronald D. McDonald, Cincinnati, Ohio, assignors to General Electric Company, a corporation of New York
Filed Mar. 30, 1966, Ser. No. 538,626
1 Claim. (Cl. 277—135)

ABSTRACT OF THE DISCLOSURE

A cable guide comprises a pair of telescoped tubes which are relatively slidable. Sealing means are provided at the free end of the outer tube and comprise an annular chamber and a relatively short peripheral surface at the outer end of the chamber which forms a capillary passage in combination with the inner tube. The sealing means prevents entry of water between the tubes and, under freezing conditions, insures a frangible ice bond.

---

The present invention relates to telescoped members and more particularly to a seal for preventing substantial entry of liquid between the telescoped portions of such members.

Telescoped members are generally provided as variable length guides for internally disposed flexible cables used for mechanically transmitting a displacement to a remote location.

Frequently, these members are operated in an environment where they may be exposed to rain, snow, or moisture. For example, certain control systems of gas turbine engines may be exposed to snow or rain which enters an engine compartment through commonly used cooling doors. When telescoped members are used in these control systems, water may enter between the telescoped portions.

This water may cause rusting, thus interfering with free motion of the telescoped members. However, an even greater problem exists when the telescoped members are in a freezing temperature environment. At this point the water between the tubes freezes to form a secure bond against further movement. If the entire telescoped portion of the members has water therebetween, the bond may be so strong that the force required to break it is extremely large. When telescoped members are used in combination with an actuator, as is frequently the case, the force exerted by the actuator to break the bond may damage the telescoped members.

Accordingly, it is an object of the present invention to provide a seal for preventing substantial entry of water between telescoped members and to do so in a simple, economical, efficient fashion.

It is a further end to achieve the above object when the members are in relative motion.

The above objects are achieved, in a broad sense, by providing, in combination with a pair of telescoped members, a sealing means for preventing liquid from entering any substantial distances along the telescoped portions of said members. The sealing means comprises a peripheral surface on the outer of the members surrounding and in closely spaced relation with the outer surface of said inner member and forming in combination therewith a peripheral capillary passage. A chamber is provided to define the inner end of the peripheral surface and is of a sufficient depth that a meniscus will be formed thereat when liquid is drawn into the capillary passage, whereby liquid drawn into the capillary passage will serve as a seal to prevent further entrance of water into the telescoped portions of said members.

Preferably, the peripheral surface has a minimum length necessary to keep the liquid in contact with the peripheral surface during a maximum anticipated rate of relative motion between the telescoped members.

The above and other related objects and features of the invention will be apparent from a reading of the following description of the disclosure found in the accompanying drawing and the novelty thereof pointed out in the appended claims.

In the drawing:
FIGURE 1 is a semifluid showing of a typical environment for the present invention.
FIGURE 2 is a partial longitudinal section view of a pair of telescoped members shown in FIGURE 1.
FIGURE 3 is an enlarged fragmentary view of the telescoped members shown in FIGURE 2.

FIGURE 1 shows in abbreviated fashion a typical environment in which the present invention may be used to provide an effective barrier against the entry of moisture between two telescoped tubes. An aircraft gas turbine engine 10, only a portion of which is shown, has a variable area exhaust nozzle 12 for optimization of engine performance. A nozzle area control 14 directs hydraulic fluid in response to suitable control inputs, through conduits 16, 18 to a plurality of nozzle actuators 19 having rods 17 which connect with and are adapted to axially position a support ring 20. The support ring 20, by means of a suitable mechanical linkage (not shown) pivots a series of flaps 22 which define the exhaust nozzle area. A typical linkage for this purpose is shown in Patent No. 2,969,641 to Schaefer, assigned to the same assignee as the present invention.

A flexible cable 24 connected to the ring 20 provides a mechanical position feedback signal to the control 14 for nulling out the demand signals used to control the movement of the nozzle actuators 19. The flexible cable 24 passes through and is guided for axial movement by a tube 26 which is suitably mounted on the engine 10. The cable 24 passes through and is further guided by a pair of inner and outer telescoped members in the form of tubes 28, 30. The inner tube 28 is mounted, by means of a suitable swivel joint 32 on the engine 10 which connects with tube 26, and the outer tube 30 is pivotally mounted by well known means on the support ring 20. One end of the flexible cable 24 fits in the tube 30 and is secured thereto by a suitable clamp 34 adjacent the ring 20.

In accordance with the present invention, the telescoped tubes 28, 30 are provided with a seal to prevent substantial entry of water therebetween. Reference is now had to FIGURE 2 which shows in detail the present invention. The outer tube 30 is provided with a housing 36 extending therefrom and having a peripheral surface 40 through which tube 28 passes. The peripheral surface 40 has a limited length which is terminated by an annular chamber 42 in the interior of housing 36.

As illustrated, the seal is formed in a separate component that may be easily secured to the outer tube 30 after simple disassembly of the telescoped tubes. However, the seal may be made an integral part of the outer tube 30 when the telescoped tubes are manufactured.

In operation, water that collects or condenses on the tube 28 may accumulate around the outer end of the peripheral surface 40. A sufficiently small clearance is provided between the peripheral surface 40 and the tube 28 to induce entry of the water therebetween by capillary action.

As illustrated in FIGURE 2, the clearance is exaggerated, but in practice is substantially less and is selected to have the greatest capillary action commensurate with free relative movement of the tubes 28, 30.

The length of the peripheral surface 40 is limited by the annular chamber 42 which has a sufficient depth to terminate the capillary action and cause a meniscus to be formed thereat. The surface tension of the water prevents further entry of water into the annular chamber 42 thus providing an effective barrier.

The peripheral surface 40 is long enough to insure that water thereon will continue to be attached by surface tension when the maximum rate of relative motion occurs between the peripheral surface 40 and the tube 28.

At the same time, the length is made short enough, consistent with the above, to result in an easily broken bond should the water between the peripheral surface 40 and tube 28 freeze. As used in the feedback loop of the nozzle area control system previously described, the bond which results when the engine 10 is shut down in a freezing environment, is broken by a force well within the capabilities of the nozzle actuators 19.

The invention thus described is not limited to use in a telescopic assembly of a variable area nozzle feedback loop, but may be used as a seal to prevent substantial entry of liquid between any telescoped members which transmit movement or act as a guide.

Other modifications will occur to those skilled in the art and the scope of the invention is therefore to be derived solely from the following claim.

Having thus described the invention, what is claimed as novel and desired to be secured by Letters Patent of the United States is:

1. A cable guide comprising a pair of telescoped inner and outer tubes, said tubes being axially movable relative to each other with the outer tube having a free end movable along the length of the inner tube, sealing means for insuring a frangible ice bond in the event water accumulates on the guide under freezing conditions, said sealing means comprising, an annular chamber having an inner end at the free end of the outer tube and a relatively short (axial peripheral surface defining the outer end of said chamber, said peripheral surface being in closely spaced relation with the outer surface of the inner tube and forming therewith a peripheral annular capillary passage, said chamber being of sufficient depth that a meniscus will be formed at the inner end of said passage in the event water is drawn therein, whereby entry of water between the telescoped tubes is limited to said capillary passage and, under freezing conditions, the ice bond formed in said passage is frangible.

References Cited

UNITED STATES PATENTS

| | | | |
|---|---|---|---|
| 2,927,829 | 3/1960 | Porter | 277—135 |
| 3,021,722 | 2/1962 | Bratz et al. | 74—501 |
| 3,038,731 | 6/1962 | Millerton | 277—135 X |
| 3,196,706 | 7/1965 | Sevrence | 74—501 |
| 3,333,512 | 8/1967 | Parsons | 92—165 X |

SAMUEL ROTHBERG, *Primary Examiner.*